May 7, 1968  W. N. LAUGHLIN  3,381,484
BUMPER

Filed Sept. 15, 1965  2 Sheets-Sheet 1

William N. Laughlin
INVENTOR.

BY Arnold and Roylance
ATTORNEYS

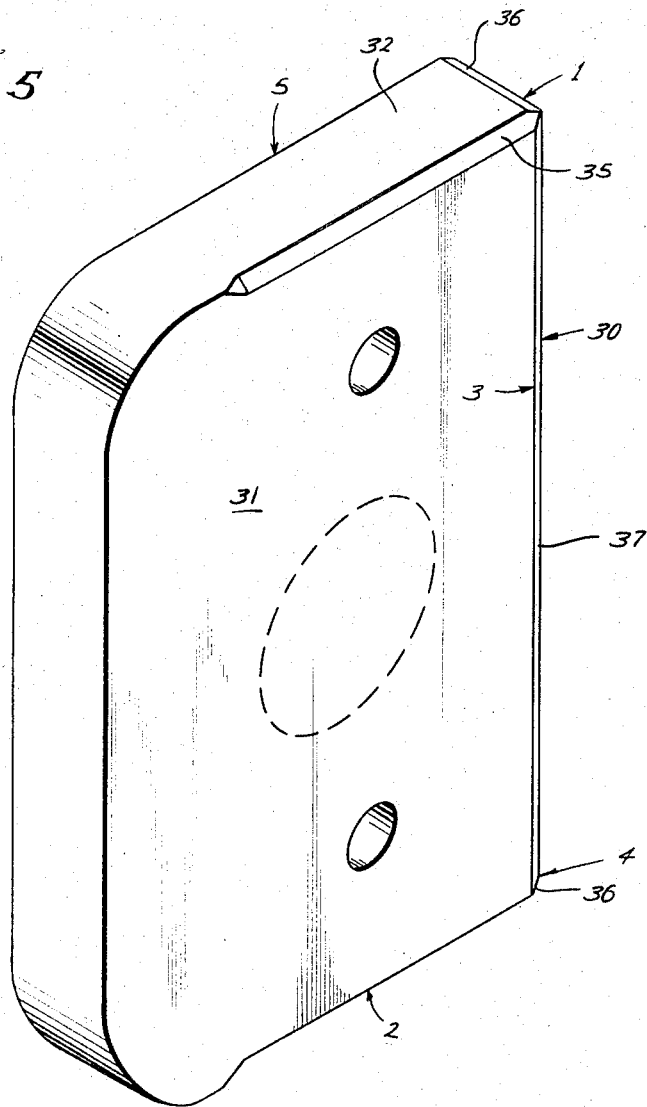

United States Patent Office 3,381,484
Patented May 7, 1968

3,381,484
BUMPER
William N. Laughlin, Box 51422,
Lafayette, La. 70501
Filed Sept. 15, 1965, Ser. No. 487,510
4 Claims. (Cl. 61—48)

ABSTRACT OF THE DISCLOSURE

A bumper assembly is provided for affixing to a support for an offshore platform. The assembly includes a channel shaped opening which may be formed by the flanges and web of an I-beam. Into this opening are placed a plurality of elastomeric bumper elements of identical configuration, the individual elements being aligned in face-to-face engagement. The bumper elements are retained in the opening by readily removable rods which extend between the flanges of the I-beam. Such rods may be readily removed so that individual bumper elements which are worn or damaged may be replaced.

---

This invention relates to a protective device which will be referred to herein as a bumper.

Briefly, the invention comprises a bumper suitable for protection of an underwater support comprising a pair of spaced apart generally rectangular plate members connected by a fastening member, thus defining an opening, and a plurality of elastomeric bumper elements held in engagement with each other within said opening by securing means extending between said parallel plates through said bumper elements.

Further, the invention comprises a bumper suitable for protection of an underwater support comprising a first generally rectangular metal plate member, a second generally rectangular metal plate member spaced in generally parallel relationship thereto, an elongated member generally perpendicular to each said first and said second plate members, securely joining said members, whereby said first plate member, said second plate member, and said elongated member form a generally channel-shaped opening, and a plurality of generally rectangular bumper elements of resilient elastomeric material held in parallel alignment and in engagement with each other within said opening by a rod-like member extending between said first and said second plate members through each of said bumper elements.

With the rapid development in the last few years of underwater drilling for minerals such as oil and gas, and especially such work offshore, there have developed a number of problems heretofore of no significant importance. One of these problems is that structures such as offshore platforms must be supported beneath the surface of the water, and these supports are easily damaged not only by the forces exerted by the elements but also by objects in the water which come into contact with such supports. The problem is especially acute in relation to crafts such as boats and barges which must necessarily dock at the platform to deliver supplies, load and unload passengers, etc. Such boats and barges will inevitably, of course, bump the support, and repeated bumping—even if relatively gentle—will cause damage to the support. In rough seas, the problem is magnified and, it will be readily understood, under such conditions crafts will often strike these supports with a great deal of force.

When it is understood that supports such as those on offshore platforms are usually constructed of metal, it is seen that injury due to the corrosive nature of sea water is greatly increased by mechanical damage to the support. And replacement of the supports, of course, is an extremely costly and laborious task.

It is with the above problems that this invention is primarily concerned. The invention provides a convenient means for greatly reducing these problems in an efficient, economical, and long-lasting manner.

In order that the manner in which the foregoing and other objects attained in accordance with the invention can be understood in detail, one advantageous embodiment of the invention will be described with reference to the accompanying drawings, which form a part of this specification, and wherein:

FIGURE 5 is a pictorial view of another embodiment of a component or bumper element such as that illustrated in FIGURE 4.

Figure 1:
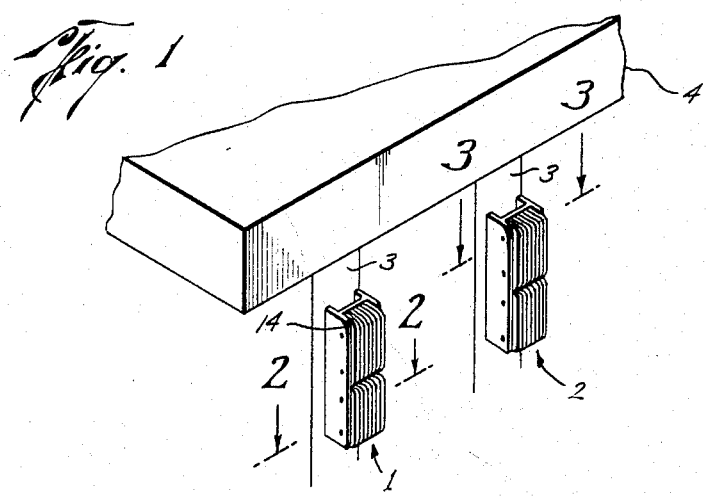
FIGURE 1 is a pictorial view of a pair of bumper assemblies constructed in accordance with this invention secured to the supports of an offshore platform.

Referring now to the drawings in greater detail, there is illustrated in FIGURE 1 a pair of bumper assemblies 1 and 2 constructed in accordance with this invention securely affixed to supports 3, 3' of platform 4, which may represent an offshore drill platform.

While the bumpers are here illustrated affixed, as by welding, to the supports 3, it will be understood that the bumpers might be mounted in other ways also. For example, the bumpers might be mounted on a craft such as a boat, barge, tender or tug. Also, the bumpers might be suspended between the support and the craft by means of a chain or cable, such an arrangement being especially useful when employed in connection with two-sided bumpers as will be hereinafter described.

Figures 2, 4:
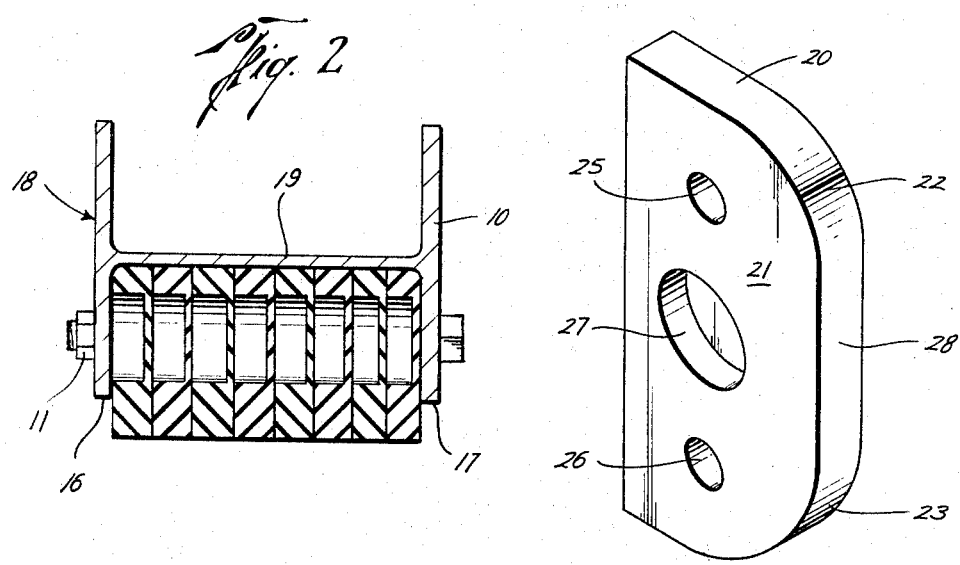
FIGURE 2 is a view taken along the line 2—2 of FIGURE 1.
FIGURE 4 is a pictorial view of a bumper element of the assembly constructed in accordance with FIGURE 1.

Each of the bumper assemblies 1, 2 is comprised of a plurality of bumper elements rigidly and securely held in an opening. This opening is conveniently formed between a pair of parallel spaced apart generally rectangular plates which are connected by fastening means conveniently in the form of an elongate member. As illustrated in FIGURE 2, such plates conveniently take the form of the opposite flanges 16 and 17 of a steel I beam 18, and such fastening means conveniently take the form of the web 19 of the I beam 18. Although I beams have been found to be particularly advantageous when employed in this invention, other types of members such as channel beams could of course be employed. The corners of such beams, as illustrated at 14, are preferably rounded so that no sharp edges protrude which might damage docking crafts or the like.

Figure 3:
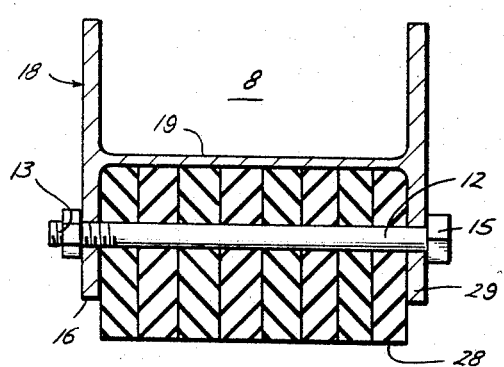
FIGURE 3 is a view taken along the line 3—3 of FIGURE 1.

Into the opening thus formed, a plurality of bumper elements are inserted as illustrated in FIGURES 2 and 3. Though such elements might take many forms, the form illustrated in FIGURE 4 has been found particularly advantageous. In that figure is illustrated a generally rectangular and generally solid bumper element 20, having a pair of parallel spaced apart major faces, one of which is viewed at 21, and parallel spaced apart side faces, one of which is viewed at 28. This particular bumper element has a height about twice as great as its length, and about ten times as great as its width. More specifically, this element is about ten inches in height, 4½ inches in width, and 1⅟₁₆ inch in thickness. Obviously, these dimensions could be varied considerably, and the particular element shown is by way of illustration only. It has also been found preferable to form bumper element 20 with gently curved edges 22 and 23, again in an effect to avoid sharp protruding corners.

At least one opening adapted to receive securing means is included in each bumper element 20. Such openings conveniently take the form of holes 25 and 26, these holes being adapted to receive a rod-like securing means such as the elongated bolt 12 shown in FIGURE 3. The holes illustrated in FIGURE 4 are each about ⅞ inch in diameter, but here again this dimension will vary depending on the size and shape of the securing means employed. Also desirably included in bumper element 20 is a recess 27, which allows a material savings while at the same time providing a damping effect and allowing the resilient rubber room for expansion upon being compressed.

Another advantageous form of bumper element is illustrated at 30 in FIGURE 5. This bumper element includes a major face 31, and end face 32, and side faces 33 and 33a, and similar parallel spaced apart major and end faces on the opposite side thereof. In this embodiment, the edge between major face 31 and end face 32, has been beveled with ⅜-inch flat at 45°, as shown at 35. Similarly, the edge between major face 31 and side face 33 has been beveled as illustrated at 37, and the edge between end face 32 and side face 33 has been beveled as indicated at 36. Such beveled edges are particularly advantageous if standard I beams or channel beams are used, which beams contain radii at the juncture of the internal right angles thereof. Clearance is also provided in this manner for the necessary filet welds. It will be understood that the beveled edges will be necessary only between the end and side faces for all bumper elements other than those which are inserted adjacent the flanges 16 and 17.

While it would be possible to employ in the bumper assemblies 1 and 2 a plurality of bumper elements of differing shapes and configurations, it will be understood that it is preferred to use elements of identical size, shape, and configuration in order to facilitate the replacement of worn or damaged elements. It is necessary, of course, that the openings in the bumper elements adapted to receive the securing means be in alignment.

Bumper elements are desirably constructed of a resilient elastomeric material such as natural or synthetic rubber.

A plurality of bumper elements such as those described above are inserted in the opening formed by the opposite flanges and web of an I beam 18. Such elements are as illustrated inserted in parallel alignment and whereby each major face of each bumper element is in engagement with the major face of the adjacent element over its entire surface area. While eight such elements are illustrated in these figures, it will be understood that any convenient number might be employed, depending, of course, on the thickness of the individual elements.

The bumper elements are held in the openings between the flanges and web of I beam 18 by rod-like securing means which extend between the two opposite flanges through each of the bumper elements. Such securing means conveniently take the form of a bolt 12 having a head 15, and threaded at 13 for engagement with a nut 11. In the desired embodiment shown in FIGURE 1, two rows of bumper elements are employed, and each row is secured by two such elongated bolts. It is seen that the bolts such as bolt 12 are readily removable from the assembly simply by removing the nut 11 from the threaded end of the bolt. In this manner, the assembly is readily disassembled at any time to allow worn, damaged or defective elements to be individually replaced. And since the rows are separate and do not overlap, one or more elements of any one of the rows of elements may be replaced without disturbing the elements in the other row or rows. While two rows are illustrated in the FIGURE 1 embodiment, it will be readily understood that as many rows as desirable may be employed. The rows are closely spaced without substantial distance therebetween, so that maximum stability of the units is achieved.

While bolt head 15 and nut 11 are illustrated in FIGURES 2 and 3 protruding beyond the outer surfaces of flanges 16 and 17, it will be understood that it is particulary desirable and preferred to construct the assembly so that such members do not so protrude. That is, it is preferable that bolt head 15 and nut 11 be flush with the outer faces of flanges 16 and 17.

It will also be noted from FIGURE 3 that side faces 28 of the bumper elements project slightly beyond the end of flanges 16 and 17. This is to provide additional protection from the sharp corners 29 of flanges 16 and 17; but it will be recognized that, if desired, the elements could be of such a length that side faces 28 are flush with corners 29. In any event, it is clear that the elements do not project a significant distance beyond the opening as defined by the ends of the flanges 16, 17, so that flexure of the elements upon impact beyond that which is needed for cushioning is prevented. In this manner, maximum stability of the bumper assemblies is achieved, with the unit thus being capable of cushioning against the heaviest impact while resisting undue wear and break off of the individual elements.

The space 8 opposite the opening into which the bumper elements are inserted is desirably left unoccupied, although additional packing could be inserted in this space if preferred. As the space 8 is similar in configuration to the space on the opposite side of web 19 into which the bumper elements are inserted, it is readily seen that it would be a simple task to form a couple or two-sided bumper assembly merely by inserting a plurality of bumper elements into space 8 also. Such a configuration is especially useful when the bumper is to be suspended between the support and a craft, as by means of chain or cable, rather than securely affixed to the support.

While the invention has been described in terms of particularly useful embodiments, it will be understood to those skilled in the art that various changes and modifications may be made without departing from the scope of this invention.

I claim:

1. A bumper assembly suitable for protecting an offshore platform member when the member extends to a point below the water level, said assembly comprising:
   an elongate first plate member;
   an elongate second plate member spaced from said first member and extending generally parallel of said first member;
   an elongate third plate member joining said first and second plate members to define an elongate beam having an elongate opening between said first, second and third plate members along one side of said beam, and the opposite side of said beam being secured to said platform member;
   at least two separate, non-overlapping, and generally parallel rows of bumper elements disposed in said elongate opening,
      each of said rows comprising a plurality of individual resilient but relatively firm bumper elements mounted in face-to-face engagement within said opening,
      said rows being closely spaced without substantial unoccupied space therebetween,
      each of said elements being rigidily retained in its row by securing means extending between said first and second plate members through said bumper elements, and each of said elements extending not significantly beyond said opening, each said element thus providing a firm cushion against impact without significant flexure of the element,
      said securing means being readily detachable from said first and second plate members,
   so that individual ones of said bumper elements which have been worn or damaged may be readily replaced, and
   so that any of the elements of one of said rows may be removed or replaced without disturbing the elements of other rows.

2. A bumper assembly in accordance with claim 1, wherein each said element includes a recess therein for absorption of shock.

3. A bumper assembly in accordance with claim 1, wherein the edges of at least some of said elements are beveled for snug fitting against said first, second and third plate members.

4. A bumper assembly suitable for protecting an offshore platform member when the member extends to a point below the water level, said assembly comprising:

an elongate first plate member presenting a generally flat face;

an elongate second plate member spaced from said first plate member, said second member also presenting a generally flat face and extending generally parallel of said first plate member;

an elongate third plate member generally perpendicular to said first and second plate members and joining said first and second members to define an elongate beam having an elongate generally channel-shaped opening between said first, second, and third plate members along one side of said beam, the opposite side of said beam being secured to said platform member;

at least two separate, non-overlapping, and generally parallel rows of bumper elements disposed between said first and second members in said opening, each of said rows comprising a plurality of individual resilient but relatively firm bumper elements of elastomeric material mounted in face-to-face engagement within said opening, said rows being closely spaced without substantial unoccupied space therebetween, each of said elements being of substantially the same overall configuration and being retained in its row by rod-like means extending between said first and second plate members through said bumper elements, and each of said elements extending not significantly beyond said opening, each said element thus providing a firm cushion against impact without significant flexure of the element, said rod-like means being readily detachable from said first and second plate members, so that individual ones of said bumper elements which have been worn or damaged may be readily replaced, and so that any of the elements of one of said rows may be removed or replaced without disturbing the elements of other rows.

References Cited

UNITED STATES PATENTS

| 2,649,295 | 8/1953 | Schuyler | 61—48 X |
| 2,799,494 | 7/1957 | Pollock | 61—48 X |
| 2,879,985 | 3/1959 | Waddell et al. | 61—48 X |

FOREIGN PATENTS

| 958,625 | 2/1957 | Germany. |
| 173,986 | 1/1961 | Sweden. |

JACOB SHAPIRO, *Primary Examiner.*